US012793926B2

(12) United States Patent
Deutschbauer et al.

(10) Patent No.: US 12,793,926 B2
(45) Date of Patent: Nov. 10, 2026

(54) ELECTRON GUN DEVICE

(71) Applicant: Comet AG, Flamatt (CH)

(72) Inventors: Daniel Deutschbauer, Thun (CH); Matthew Price, Neyruz (CH); Michael Chabior, Bern (CH)

(73) Assignee: Comet AG, Flamatt (CH)

( * ) Notice: Subject to any disclaimer, the term of this patent is extended or adjusted under 35 U.S.C. 154(b) by 173 days.

(21) Appl. No.: 18/947,358

(22) Filed: Nov. 14, 2024

(65) Prior Publication Data

US 2025/0157778 A1 May 15, 2025

(30) Foreign Application Priority Data

Nov. 15, 2023 (EP) .................................... 23210158

(51) Int. Cl.
*H01J 35/06* (2006.01)
*H01J 9/18* (2006.01)

(52) U.S. Cl.
CPC .............. *H01J 35/064* (2019.05); *H01J 9/18* (2013.01); *H01J 2235/1291* (2013.01)

(58) Field of Classification Search
CPC .... H01J 35/064; H01J 9/18; H01J 2235/1291; H01J 1/88; H01J 35/066; H01J 35/065; H01J 9/025
See application file for complete search history.

(56) References Cited

U.S. PATENT DOCUMENTS 3,663,855 A * 5/1972 Boettcher ................ H01T 2/02 313/355
4,243,911 A 1/1981 Winarsky et al.
4,760,567 A 7/1988 Crewe
5,241,182 A 8/1993 Martin et al.
5,534,747 A 7/1996 Carruthers
6,111,932 A 8/2000 Dinsmore
7,336,764 B2 2/2008 Reynolds
9,042,520 B2 5/2015 Jeong et al.
(Continued)

FOREIGN PATENT DOCUMENTS

EP 0509771 A1 10/1992
EP 2775508 A2 9/2014
(Continued)

OTHER PUBLICATIONS

European search report for EP Application No. 23210158.4 dated May 10, 2024.

*Primary Examiner* — Kiho Kim
(74) *Attorney, Agent, or Firm* — MLO, a professional corp.

(57) ABSTRACT

An electron gun device, in particular for an X-ray tube, includes a metallic first electrode having a first electrode contact surface; a metallic second electrode having a second electrode contact surface; and a ring-shaped ceramic insulator having a first insulator contact surface on a first side with respect to an axial direction of the insulator and a second insulator contact surface on an opposite second side with respect to the axial direction. In an assembled state, the first insulator contact surface faces the first electrode contact surface and is connected to the first electrode contact surface via a first brazing joint, and the second insulator contact surface faces the second electrode contact surface and is connected to the second electrode contact surface via a second brazing joint.

15 Claims, 5 Drawing Sheets

(56) References Cited

U.S. PATENT DOCUMENTS

| | | | |
|---|---|---|---|
| 9,048,059 | B2 | 6/2015 | Jeong et al. |
| 9,305,738 | B2 | 4/2016 | Liu et al. |
| 9,536,695 | B2 | 1/2017 | Liu et al. |
| 9,754,758 | B2 | 9/2017 | Park et al. |
| 10,522,316 | B2 | 12/2019 | Jeong et al. |
| 11,515,117 | B2 | 11/2022 | Cross et al. |
| 2023/0050180 | A1 | 2/2023 | Cross et al. |
| 2023/0223230 | A1 | 7/2023 | Jeong |

FOREIGN PATENT DOCUMENTS

| | | | |
|---|---|---|---|
| EP | 2879154 | B1 | 6/2015 |
| EP | 3394875 | B1 | 10/2018 |
| GB | 880738 | A | 10/1961 |
| JP | 2002373601 | A | 12/2002 |
| JP | 2012031008 | A | 2/2012 |
| KR | 101070091 | B1 | 10/2011 |
| KR | 102047436 | B1 | 11/2019 |

* cited by examiner

ELECTRON GUN DEVICE

RELATED APPLICATIONS

This application claims priority to EP patent application Ser. No. 23210158.4, filed Nov. 15, 2023, which is incorporated herein by reference.

BACKGROUND

The invention pertains to an electron gun device, an X-ray tube and a method for assembling of an electron gun device.

Known electron guns for use in X-ray tubes often comprise a multitude of electrodes held together by rod-shaped isolators along the length of the assembly. These isolators are usually made from glass, or less common, ceramics. The necessary precision during assembly is difficult to achieve and man-hour intensive. Furthermore, quality control procedures are complex.

SUMMARY

An objective of the invention is, in particular, to make an improved electron gun available, in particular regarding costs and/or assembly effort.

An electron gun device, in particular for an X-ray tube, preferably an X-ray microfocus tube, is proposed, comprising:

- a metallic first electrode having a first electrode contact surface;
- a metallic second electrode having a second electrode contact surface; and
- a ring-shaped ceramic insulator having a first insulator contact surface on a first side with respect to an axial direction of the insulator and a second insulator contact surface on an opposite second side with respect to the axial direction,
- wherein, in an assembled state, the first insulator contact surface faces the first electrode contact surface and is connected to the first electrode contact surface via a first brazing joint, and the second insulator contact surface faces the second electrode contact surface and is connected to the second electrode contact surface via a second brazing joint.

By the invention an improved electron gun device can be made available. Costs can be reduced, especially regarding materials used and a stability of the manufacturing process, and an assembly can be simplified. The electron gun device according to the invention is mechanically stable and exhibits a good thermal and electric performance and stability.

The electron gun device is in particular a part, preferably a sub-assembly, of an electron gun. Alternatively, the electron gun could be embodied by the electron gun device. The electron gun and/or the electron gun device is advantageously part of an X-ray tube, preferably an X-ray microfocus tube, for generating X-rays. The electron gun and/or the electron gun device is intended for generating free electrons and ejecting these along an electron beam direction, which is in particular parallel to the axial direction. The electron gun device may comprise an electron emitter for emitting the electrons and may further comprise a connection unit for connecting a high voltage for accelerating the electrons, wherein electrical contacting within the connection unit could be done in any conceivable way, e.g., by brazing, welding, clamping and/or crimping. The X-ray tube may further comprise an electron tube, in which the electron gun device may at least be partly located, and/or a high voltage supply for supplying the high voltage and/or a target head, in particular an anode target head, preferably located adjacent to the electron tube and in particular having a target, preferably made from tungsten, for generating X-rays via the electrons hitting the target.

Any type of electron emitter is conceivable, yet preferably an oxide-coated dispenser-cathode is used, which is in particular made from a block of porous tungsten infiltrated by chemicals, most importantly BaO (Barium oxide) which reduced the work function of pure tungsten and causes the emitter to function at much lower temperatures compared to pure tungsten. Herein, the actual emitter surface may be indirectly heated by a heating filament which is potted into alumina. Alternatively, the electron emitter could comprise simple tungsten or tungsten-rhenium filaments, as well as $LaB_6$ or $CeB_6$ (lanthanum or cerium hexaboride) crystal emitters. In yet another alternative a field-effect emitter would also be conceivable.

The electrode emitter is in particular electrically contacted as a cathode during operation, in particular via the connection unit and preferably at an electric potential between −3 kV and −0.5 kV. The electron gun preferably comprises a metallic third electrode that may be electrically connected to the electrode emitter. Thus, the third electrode and the electrode emitter together may constitute a cathode during operation, preferably at a common electric potential between −3 kV and −0.5 kV. The third electrode may be in the shape of a disk, preferably a circular disk, wherein recesses and/or cutouts, in particular for electrical leads of the electron gun device, are however conceivable.

The first electrode may be a grid electrode, in particular intended for controlling an electron flux, which could at least temporarily be at an electric potential more negative than the electrode emitter and/or the third electrode, in particular via the connection unit and preferably down to a negative electric potential between −4 kV and −0.5 kV. The first electrode may be in the shape of a disk, preferably a circular ring disk, in particular with a first passage for letting the electrons pass.

The second electrode may be a focus electrode, which could be at a more positive electric potential than the first electrode and/or the third electrode and/or the electron emitter during operation, in particular via the connection unit. The second electrode could be at ground potential during operation. The second electrode may be in the shape of a disk, preferably a circular ring disk, in particular with a second passage for letting the electrons pass and/or exit the electron gun and/or the electron gun device. Thus, the second passage may at least partly define an aperture opening of the electron gun and/or the electron gun device.

The insulator encompasses an open interior, wherein the axial direction is in particular defined by a normal on the face of the open interior. Preferably, the insulator is circular ring-shaped. Preferably, a normal on the first insulator contact surface and/or the second insulator contact surface encloses an angle with the axial direction of less than 60°, in particular of less than 30°, preferably of less than 15° and ideally 0°. Advantageously, the axial direction is perpendicular to the first insulator contact surface and/or the second insulator contact surface. The first insulator contact surface and the second insulator contact surface are preferably parallel to each other.

The electron gun device may comprise a further ring-shaped, preferably circular ring-shaped, ceramic insulator in between the first electrode and the third electrode, having a further axial direction. The further insulator is identically fixed in between the first electrode and the third electrode as the insulator is fixed in between the first electrode and the second electrode. For this, the third electrode preferably comprises a third electrode contact surface which, in the assembled state, faces a third insulator contact surface of the further insulator, wherein a third brazing joint joins the third electrode contact surface and the third insulator contact surface. The further insulator preferably further comprises a fourth insulator contact surface which faces a fourth electrode contact surface of the first electrode, wherein a fourth brazing joint joins the fourth electrode contact surface and the fourth insulator contact surface in the assembled state. Preferably, the further insulator is at least to a large extend and preferably completely identical to the insulator. However, the further insulator may have a different total extension along its further axial direction than the insulator along its axial direction. Furthermore, the further insulator may have a different maximum and/or minimum transverse width with respect to its further axial direction than the insulator with respect to its axial direction.

The first electrode, the insulator and the second electrode are in particular stacked, one above the other, in particular with the first brazing joint and second brazing joint in between. The first electrode, the insulator and the second electrode are in particular stacked face on with respect to each other, with the first brazing joint and second brazing joint in between. Preferably, the third electrode, the further insulator, the first electrode, the insulator and the second electrode are stacked one above the other in the given order, in particular with brazing joints in between each insulator-electrode pair. Preferably, the third electrode, the further insulator, the first electrode, the insulator and the second electrode are stacked face on in the given order, in particular with brazing joints in between each insulator-electrode pair.

In the assembled state the first electrode contact surface and the first insulator contact surface are preferably parallel to each other. In the assembled state the second electrode contact surface and the second insulator contact surface are preferably parallel to each other. The same is preferably true for the respective contact surfaces between the first electrode, the further insulator and the third electrode. In the assembled state the first electrode contact surface and the second electrode contact surface and preferably also the third electrode contact surface and preferably the fourth electrode contact surface are preferably perpendicular to the axial direction. Preferably, in the assembled state the axial direction and the further axial direction are parallel to each other. In the assembled state the first passage, the second passage and the open interior of the insulator and preferably also the further open interior of the further insulator are aligned with each other and in particular also aligned with the electrode emitter.

In particular depending on the field of application, the electron gun device could have more than three electrodes and could also have more than two insulators. The outer diameter of the first electrode and/or the second electrode and/or the third electrode is at least 5 mm and at most 20 mm. A thickness of the first electrode and/or the second electrode along the axial direction is preferably between 0.1 mm and 0.5 mm.

The brazing joints are, in particular, elements located between and connecting the respective contact surfaces, the elements being formed by a brazing filler metal, in particular a brazing alloy, which solidified after a brazing operation. The brazing joints may enclose the open interior of the insulator and/or the further open interior of the further insulator at least partly and preferably completely. The brazing joints are preferably ring-shaped, in particular circular ring-shaped. Ideally the brazing joint form continuous rings.

In this document, the terms “parallel” or “perpendicular” are to be understood as parallel or perpendicular with a maximum deviation of +/−5° and/or taking manufacturing and/or installation tolerances into account. Furthermore, the terms “first”, “second” and “third” are to be understood merely as identifiers to distinguish different elements from each other. They are not to be construed as implicating a sequence and/or a hierarchy of elements. Furthermore, the existence of a “second” element does not imply that a “first” element exists. Correspondingly, the mention of a “third” element does not mean that a “first” and a “second” element are necessarily present. The same is true for the term “further”: A “further element” does not imply that an “element” also exists.

Moreover, it is proposed that the first insulator contact surface and/or the second insulator contact surface and/or the third insulator contact surface and/or the fourth insulator contact surface contains unmetallized portions and is preferably essentially completely unmetallized before brazing. Through this, costs and/or an assembly effort can be most advantageously reduced. Preferably the insulator and/or the further insulator is completely made from a ceramic material. In alternative embodiments, the first insulator contact surface and/or the second insulator contact surface and/or the third insulator contact surface and/or the fourth insulator contact surface could contain metallized portions and could be completely metallized before brazing.

Furthermore, it is proposed that the insulator and/or the further insulator contains and is preferably made from aluminum oxide or aluminum nitride, by what advantageous material properties can be obtained, in particular regarding thermal properties, e.g., thermal conductivity. The thermal performance can additionally be improved by using aluminum nitride for the insulator and/or the further insulator, taking benefit of its superior thermal conductivity as compared to other isolating materials like glass or aluminum oxide.

The first electrode and/or the second electrode and/or the third electrode could contain and preferably be made from various materials, by way of example tungsten or rhenium or alloys thereof.

In a preferred embodiment of the invention, however, it is proposed that the first electrode and/or the second electrode and/or the third electrode contains and is preferably made from molybdenum or an alloy thereof. Thus, low thermal expansion of the electrode can be obtained during brazing and/or operation of the electron gun device, in particular helping with electron current and X-ray focal spot stability during operation. The combination of molybdenum for the electrodes and aluminum nitride for the insulator and/or the further insulator is most advantageous due to their very similar thermal expansion coefficients, namely 4.8 ppm/K for molybdenum and 4.0-5.0 ppm/K at 20°, which in this combination can help balance the thermomechanical stresses that build up during brazing. Other material combinations could lead to stress cracks in the ceramic during brazing.

In particular, the flat-faced geometry and/or choice of materials allows the use of active metal brazing, which reduces the need for prior metallization of the ceramics, strongly cutting down costs for the electron gun device. Active brazing works especially well in this geometry as the parts are placed face-on, since the active braze metal in molten state shows relatively low wetting and does not flow well over the ceramic surface.

Thus, it is proposed that the first brazing joint and/or the second brazing joint and/or the third brazing joint and/or the fourth brazing joint is an active brazing joint. Preferably, all brazing joints are active brazing joints. Thereby, costs and/or an assembly effort can be advantageously decreased. The first brazing joint and/or the second brazing joint and/or the third brazing joint and/or the fourth brazing joint is in particular achieved by active metal brazing processes, preferably conducted simultaneously at the same time, most advantageously in the same brazing furnace, wherein brazing is preferably done using active brazing alloys on unmetallized insulator contact surfaces. Preferably brazing is done via high temperature vacuum furnace brazing. In active metal brazing, a metal, preferably titanium, is in particular added to the brazing alloy to improve reaction and wetting with the ceramic substrate. The addition of titanium, for example, to some brazing alloy compositions results in increased reactivity and improvement in the wetting behavior, whereby the ceramic substrate is in particular wet by a formation of an intermetallic interfacial reaction product which may form a joint with the brazing alloy. The active brazing alloy may be based on a 72Ag-28Cu eutectic alloy, to which 1-5 wt % titanium is added. Indium may be added to lower the eutectic temperature. However, other active brazing alloys are also conceivable, for example AgCuSnTi.

In one embodiment of the invention, it is proposed that the first brazing joint is done using a first brazing foil between the first electrode contact surface and the first insulator contact surface and/or the second brazing joint is done using a second brazing foil between the second electrode contact surface and the second insulator contact surface and/or the third brazing joint is done using a third brazing foil between the third electrode contact surface and the third insulator contact surface and/or the fourth brazing joint is done using a fourth brazing foil between the fourth electrode contact surface and the fourth insulator contact surface. Thereby, assembly and/or manufacturing of the electron gun device can be further simplified. The first brazing foil and/or second brazing foil and/or third brazing foil and/or fourth brazing foil may be ring-shaped, preferably circular ring disk-shaped, most preferably in the form of a flat washer, and may completely surround the open interior of the insulator and/or the further open interior of the further insulator in the assembled state. A thickness of the first brazing foil and/or second brazing foil and/or third brazing foil and/or fourth brazing foil may be in the range of 0.025 mm to 0.050 mm. The brazing foils are made from an active metal brazing material, preferably AgCuSnTi. Preferably, all brazing foils are identical to each other. During manufacturing, the electrodes and the insulator or insulators may be alternatingly stacked one above the other with the brazing foils interleaved. This assembly may then be heated in a brazing furnace, in particular a high temperature vacuum furnace, thereby melting the brazing foils and interconnecting the whole assembly.

Advantageously, the insulator comprises at least one holding feature for delimiting a flow of a brazing filler metal during brazing. Through this, reliable and advantageously facile brazing can be ensured. The holding feature may comprise an indentation and/or a surface wrinkling for stemming the flow of the brazing filler metal. Correspondingly, the further insulator may as well comprise at least one further holding feature for delimiting a flow of a brazing filler metal during brazing.

Preferably, the holding feature comprises a first collar at least partly and preferably completely encircling the first insulator contact surface and/or a second collar at least partly and preferably completely encircling the second insulator contact surface. Thereby, the flow of the brazing filler metal can be advantageously delimited. Furthermore, the first collar and/or second collar can be used as limit stop for a further element, in particular a brazing foil. It can in particular be made sure that the first brazing joint and/or the second brazing joint is located where it is supposed to be. The first collar and/or the second collar is preferably embodied as a portion of the insulator elevated over the first contact surface and/or the second contact surface with respect to the axial direction. Correspondingly, the further holding feature of the further insulator may comprise a further first collar at least partly and preferably completely encircling the third insulator contact surface and/or a further second collar at least partly and preferably completely encircling the fourth insulator contact surface.

In one embodiment of the invention, it is proposed that the holding feature and/or the further holding feature is further intended for positioning a brazing foil, in particular the aforementioned first brazing foil and/or second brazing foil, prior to brazing. Thus, assembly and/or manufacturing of the electron gun device can be further simplified, in particular if no further fixing feature is employed. Preferably, the first brazing foil and/or the second brazing foil, most preferably tightly, fits within the region encircled by the first collar and/or the second collar, in order to prevent any movement of the first brazing foil and/or the second brazing foil during handling of the assembly before brazing. Preferably, the third brazing foil and/or the fourth brazing foil, most preferably tightly, fits within the region encircled by the further first collar and/or the further second collar, in order to prevent any movement of the third brazing foil and/or the fourth brazing foil during handling of the assembly before brazing.

It is further proposed that the holding feature at least partly overlaps the first electrode and/or the second electrode preferably at least with respect to the axial direction. The first collar preferably covers an edge of the first electrode whereas the second collar preferably covers an edge of the second electrode. The first collar and/or second collar may have an extension along the axial direction of less than half the thickness of the first electrode and/or the second electrode. A radial thickness of the first collar and/or the second collar may be in the order of several tenth of millimeters. Thereby, advantageous mechanical and/or electric properties can be achieved. The holding feature is preferably intended to act as a dielectric barrier against spurious electron emission in the vicinity of the electrode-insulator interface. Through this, a reliability of the electron gun device can be increased.

Summarizing, the shape of the insulator and/or the further insulator can be done in a way as to act as a guiding for the brazing filler metal and brazing fixture for the brazing foil, keeping it in place by form locking, and preventing the active metal brazing to stick to a potential brazing fixture. At the same time this proposed shape of the insulator and/or the further insulator may act as both a mechanical shield and electrical field former towards the outside of the X-ray tube.

Furthermore, a method for assembling of an electron gun device, in particular the electron gun device described above, is proposed, the electron gun device comprising: a metallic first electrode having a first electrode contact surface; a metallic second electrode having a second electrode contact surface; and a ring-shaped ceramic insulator having a first insulator contact surface on a first side with respect to an axial direction of the insulator and a second insulator contact surface on an opposite second side with respect to the axial direction, wherein the first insulator contact surface is mounted facing the first electrode contact surface and is connected to the first electrode contact surface via a first brazing, and the second insulator contact surface is mounted facing the second electrode contact surface and is connected to the second electrode contact surface via a second brazing, preferably conducted simultaneously to the first brazing.

Through this an improved electron gun device can be made available. Costs can be reduced, and an assembly can be simplified. The electron gun device obtained by the method according to the invention is mechanically stiff and exhibits a good thermal and electric performance and stability.

It is further proposed that brazing is done using an active brazing filler metal on unmetallized insulator contact surfaces, whereby costs and/or an assembly effort can be advantageously decreased as described above.

Preferably, the first brazing is made using a first brazing foil between the first electrode contact surface and the first insulator contact surface and/or the second brazing is made using a second brazing foil between the second electrode contact surface and the second insulator contact surface and/or the third brazing joint is done using a third brazing foil between the third electrode contact surface and the third insulator contact surface and/or the fourth brazing joint is done using a fourth brazing foil between the fourth electrode contact surface and the fourth insulator contact surface. Thereby, assembly and/or manufacturing of the electron gun device can be further simplified. The flow of the brazing alloy is may preferably be impaired by at least one holding feature at least partly keeping a brazing alloy between the contact surfaces during brazing.

It is understood that the subject matter of the invention is not limited to the embodiment described above. The described embodiments and features may be arbitrarily combined by those skilled in the art without departing from the subject matter of the invention.

BRIEF DESCRIPTION OF THE DRAWINGS

Preferred embodiments of the invention are explained in greater detail below with reference to the appended schematic drawings, which show the following.

DETAILED DESCRIPTION

Figure 1:
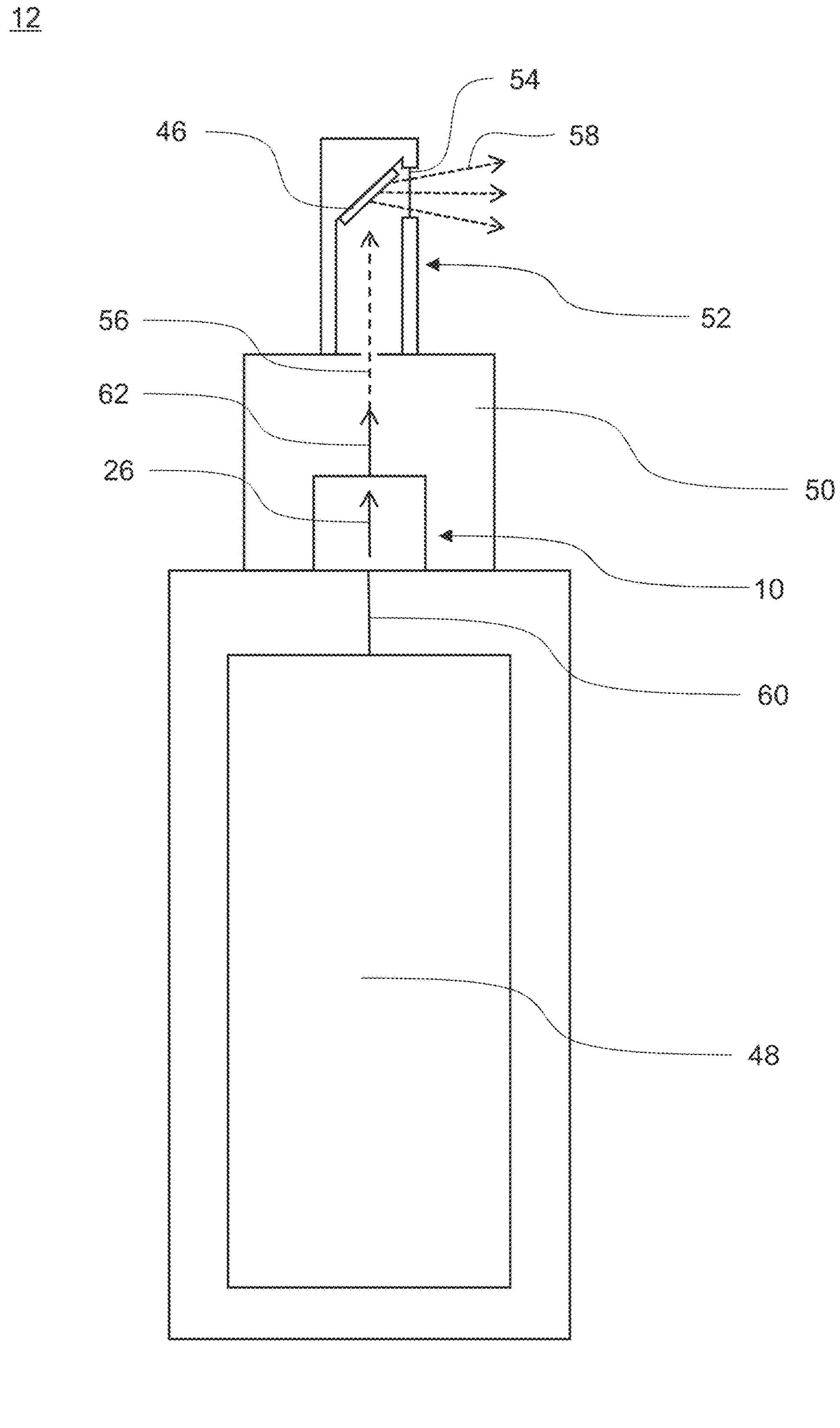
FIG. 1 an X-ray tube comprising an electron gun device.

FIG. 1 shows an X-ray tube 12, whose geometry and mode of operation is principally known. The X-ray tube 12 comprises an electron gun device 10. The X-ray tube 12 further comprises an electron tube 50, in which the electron gun device 10 is at least partly located. At least during operation, the electron tube 50 is evacuated. The X-ray tube 12 comprises a high voltage supply 48 for supplying a high voltage to the electron gun device 10 via a voltage supply connection 60 of the X-ray tube 12. The electron gun device 10 is intended to generate and eject free electrons 56 along an electron beam direction 62 into the electron tube 50. The electrons 56 are accelerated via a high voltage provided by the high voltage supply 48 toward a target head 52 of the X-ray tube 12. The target head 52 comprises a target 46, whereupon the electrons 56 are directed. Upon hitting the target 46, X-rays 58 are generated and allowed to exit the target head 52 via a window 54 of the target head 52. The target 46 could be made from any suitable material, for example tungsten.

Figure 2:
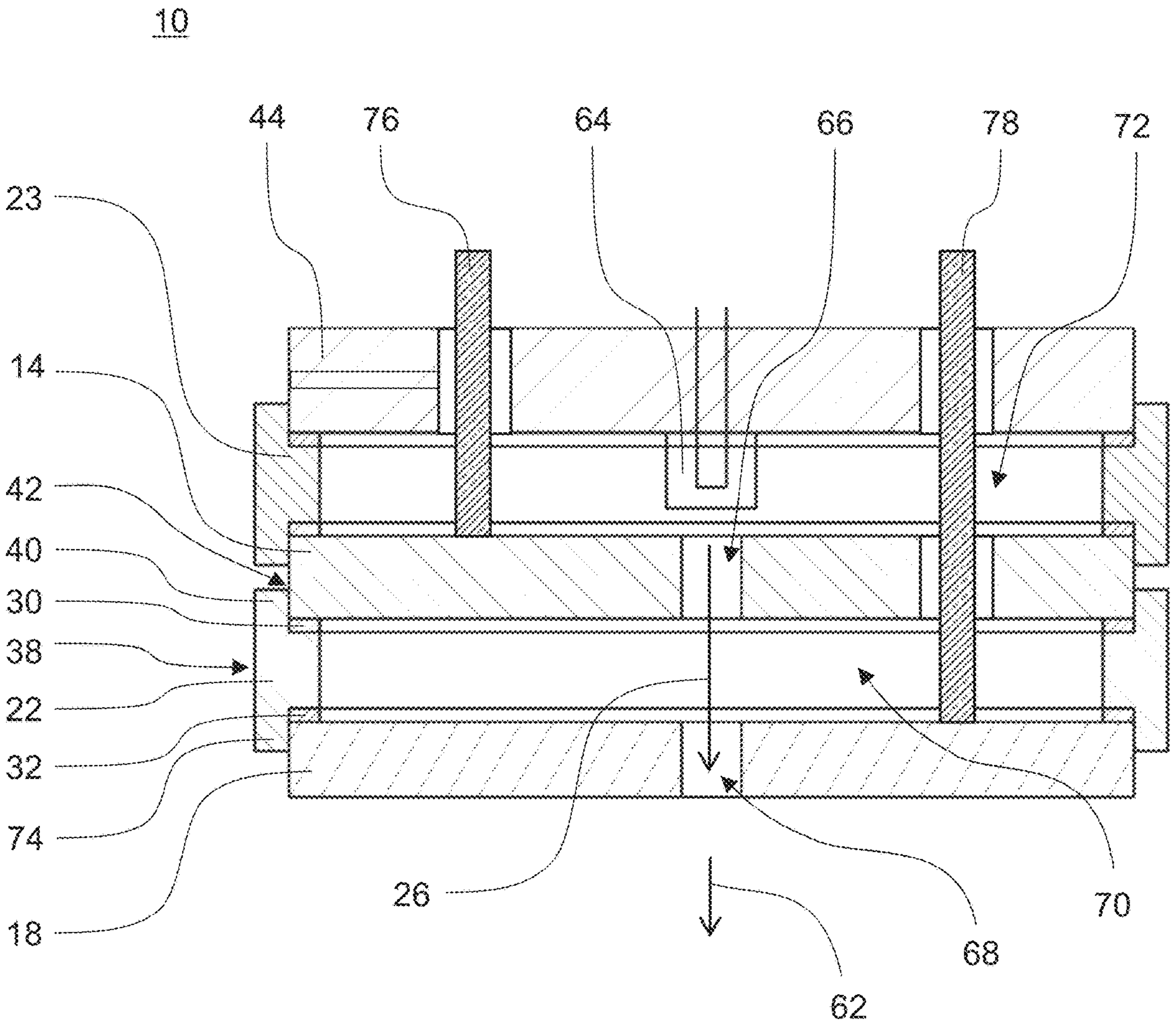
FIG. 2 the electron gun device in an assembled state.

The invention is directed to the electron gun device 10, which is shown in FIG. 2 in its assembled state. The electron gun device 10 comprises an electron emitter 64 for generating the free electrons 56. The electrode emitter 64 is an oxide-coated dispenser-cathode, which is made from a block of porous tungsten infiltrated by chemicals, most importantly BaO (Barium oxide), and whose actual emitter surface is indirectly heated by a heating filament which is potted into alumina (not shown). However, any other type of electron emitter would also be conceivable.

The freed electrons 56 are then accelerated and ejected via a stack of three metallic electrodes 14, 18, 44, namely a metallic first electrode 14, a metallic second electrode 18 and a metallic third electrode 44. In alternative embodiments a different number of metallic electrodes 14, 18, 44 could be chosen, for example 2 or at least 4.

The electron emitter 64 is electrically connected to the third electrode 44. During operation, the third electrode 44 and the electrode emitter 64 together constitute a cathode at an electric potential of typically −3 kV to −0.5 kV. However, a different electric potential could also be conceivable. The third electrode 44 is in the shape of a circular disk with recesses and/or cutouts for the electron emitter 64 and/or for electrical leads to the electron emitter 64 and/or for electrical leads for high voltage supply of the electrodes 14, 18, 44.

The first electrode 14 is located between the third electrode 44 and the second electrode 18. The first electrode 14 is a grid electrode, intended for controlling an electron flux. The electric potential of the first electrode 14 is changeable and could be set to a potential that is more negative than the cathode potential. The first electrode 14 is in the shape of a circular ring disk with a first passage 66 for letting the electrons 56 pass. The first electrode 14 has a thickness between 0.1 mm and 0.5 mm.

The second electrode 18 is a focus electrode. During operation, the second electrode 18 is at a more positive potential than the first electrode 14 and the third electrode 44. The second electrode 18 is at ground potential during operation. The second electrode 18 is in the shape of a circular ring disk with a second passage 68 for letting the electrons 56 pass and exit the electron gun device 10 along the electron beam direction 62. Thus, the second passage 68 defines an aperture opening of the electron gun device 10. The second electrode 18 has a thickness between 0.1 mm and 0.5 mm.

Figure 4:
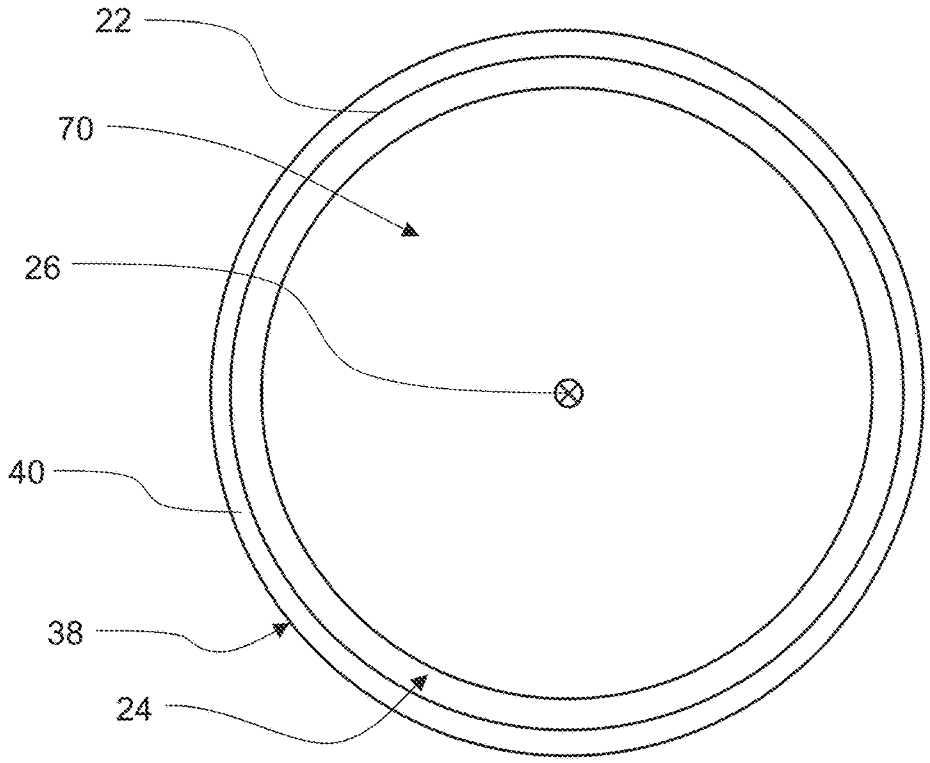
FIG. 4 a ring-shaped ceramic insulator of the electron gun device.

The electron gun device 10 comprises a circular ring-shaped ceramic insulator 22 and a circular ring-shaped ceramic further insulator 23. The electrodes 14, 18, 44 are separated and electrically insulated against each other by the insulator 22 and the further insulator 23. FIG. 4 shows a top view of the insulator 22. The further insulator 23 is identical to the insulator 22 in the present embodiment. However, the further insulator 23 could also have a different geometry and/or material composition than the insulator 22. The insulator 22 has an open interior 70. The further insulator 23 has a further open interior 72. The open interiors 70, 72, the passages 66, 68 and the electron emitter 64 are all aligned along an axial direction 26 of the insulator 22 in order to allow the electrons 56 to pass. The open interiors 70, 72, the passages 66, 68 and the electron emitter 64 are all aligned along the electron beam direction 62.

The electrodes 14, 18, 44 and the insulators 22, 23 are alternatingly stacked one on top of the other. The electrodes 14, 18, 44 and the insulators 22, 23 are alternatingly stacked face on. Starting from the electron emitter 64, the ordering is as follows: third electrode 44, further insulator 23, first electrode 14, insulator 22, and finally second electrode 18. A distance along the axial direction 26 between the first electrode 14 and the second electrode 18 is between 0.05 mm and 0.5 mm, in particular 0.25 mm. A distance along the axial direction 26 between the electron emitter 64 and the first electrode 14 is between 0.05 mm and 0.5 mm, in particular 0.1 mm.

The first electrode 14 comprises a first electrode contact surface 16. The second electrode 18 has a second electrode contact surface 20. The insulator 22 comprises first insulator contact surface 24 on a first side with respect to the axial direction 26, the axial direction 26 being parallel to the electron beam direction 62, and a second insulator contact surface 28 on an opposite second side with respect to the axial direction 26. In an assembled state, the first insulator contact surface 24 faces the first electrode contact surface 16 and is connected to the first electrode contact surface 16 via a first brazing joint 30. Likewise, the second insulator contact surface 28 faces the second electrode contact surface 20 and is connected to the second electrode contact surface 20 via a second brazing joint 32.

The electrode 14, 18, 44 are made from molybdenum. The insulators 22, 23 are made from any typical technical ceramic, such as aluminum oxide or aluminum nitride, the latter being preferred since it has a similar thermal expansion coefficient like molybdenum. Each of the insulators 22, 23 is connected to two of the electrodes 14, 18, 44 by active metal brazing in a high temperature vacuum furnace (not shown). The first insulator contact surface 24 and the second insulator contact surface 28 are essentially completely unmetallized before brazing. The first brazing joint 30 and the second brazing joint 32 are active brazing joints.

Figure 3:
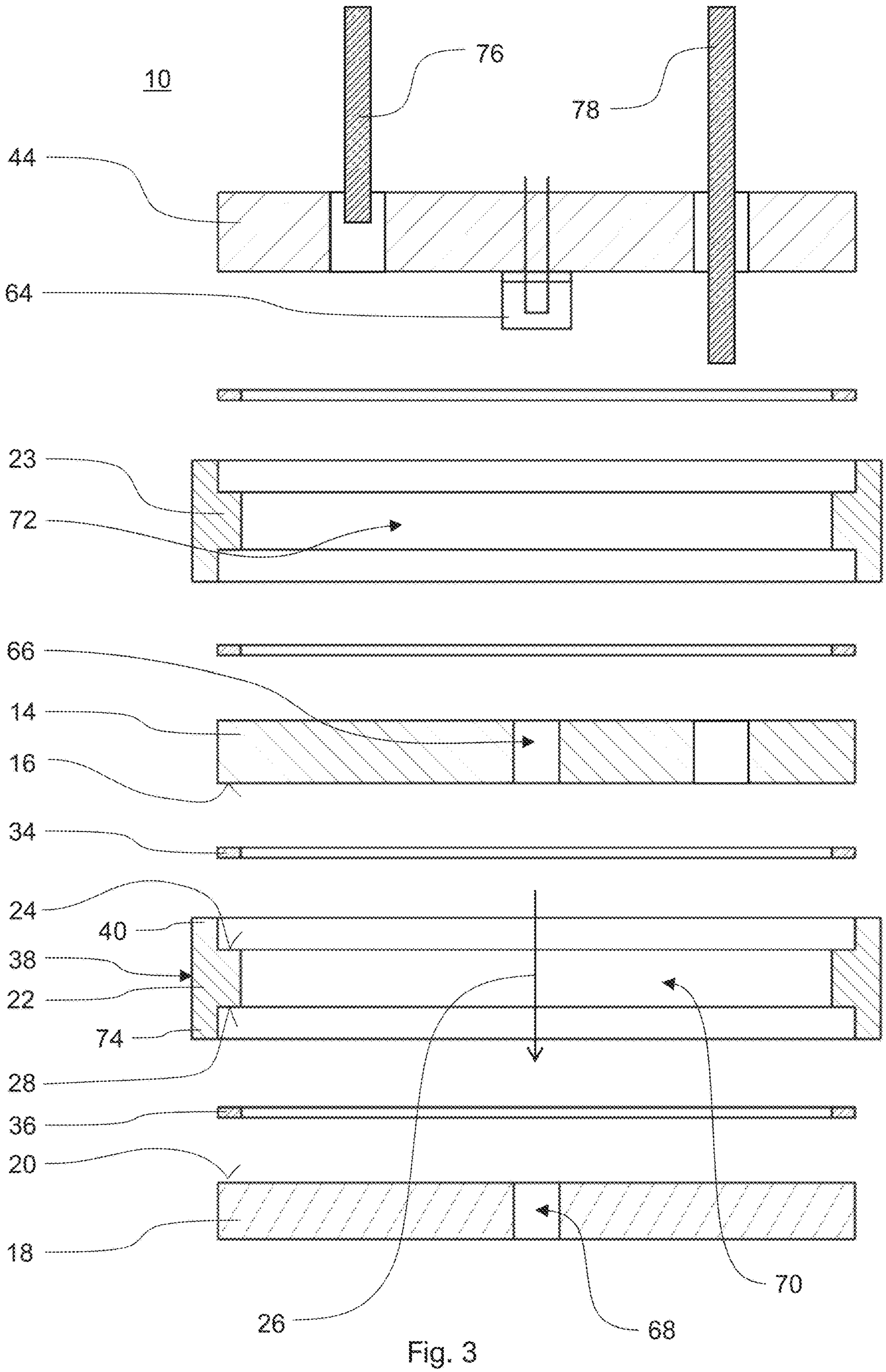
FIG. 3 the electron gun device in a disassembled state before brazing.
Figure 5:
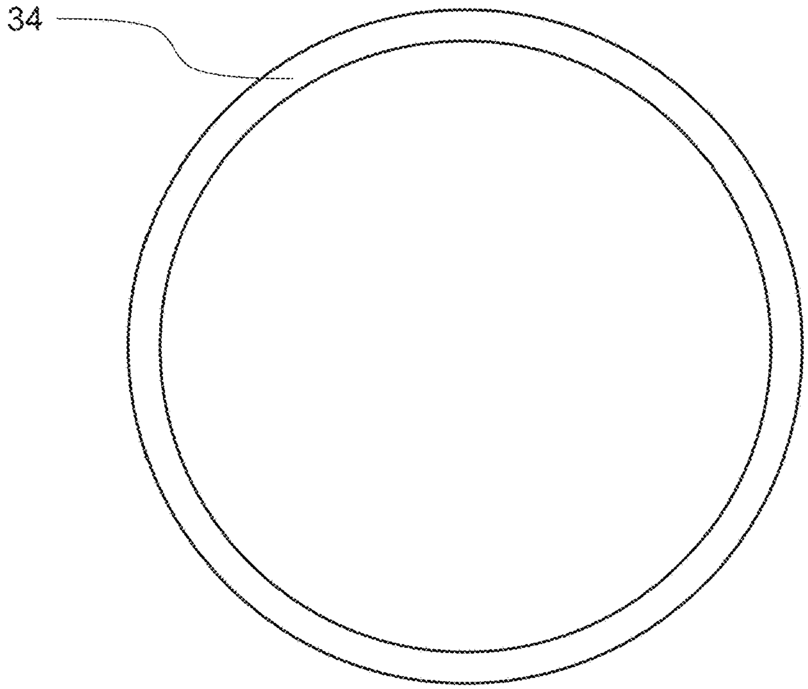
FIG. 5 a brazing foil of the electron gun device.

FIG. 3 shows an exploded view of the electron gun device 10 prior to brazing. The first brazing joint 30 is done using a first brazing foil 34 between the first electrode contact surface 16 and the first insulator contact surface 24 and the second brazing joint 32 is done using a second brazing foil 36 between the second electrode contact surface 20 and the second insulator contact surface 28. The brazing foils 34, 36 are made from active metal brazing material. FIG. 5 shows a top view of the first brazing foil 34. The second brazing foil 36 is identical to the first bracing foil 34 in the present embodiment. However, the second brazing foil 36 could also have a different geometry and/or material composition than the first bracing foil 34.

The insulator 22 comprises a holding feature 38 for delimiting a flow of a brazing filler metal during brazing. The holding feature 38 is further intended for positioning the first brazing foil 34 and the second brazing foil 36 prior to brazing. The holding feature 38 comprises a first collar 40 completely encircling the first insulator contact surface 24 and a second collar 74 completely encircling the second insulator contact surface 28. The brazing foils 34, 36 snugly fit into the respective collar 40, 74 and are dimensioned to not reach into the open interior 70 of the insulator 22. The cross sectional area of the insulators 22, 23 is that of a vertically flattened letter “T” with the collars 40, 74 at least partly forming the crossbar.

In the assembled state the holding feature 38 and the collars 40, 74, at least partly overlap the first electrode 14 and the second electrode 18 with respect to the axial direction 26. During operation, the holding feature 38 is intended to act as a dielectric barrier against spurious electron emission in the vicinity of the electrode-insulator interface 42.

The above descriptions regarding the connection of the insulator 22 to the first electrode 14 and the second electrode 18 apply likewise to the connection of the further insulator 23 to the first electrode 14 and the third electrode 44.

Figure 6:
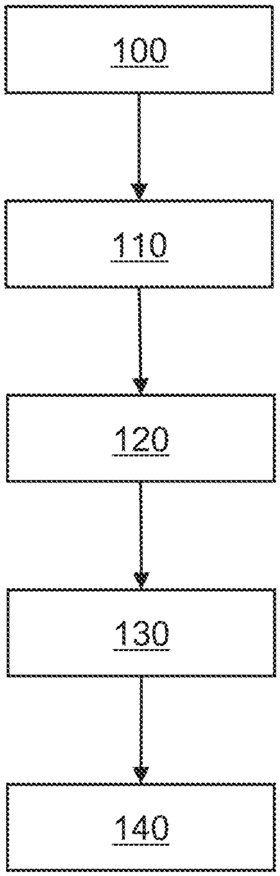
FIG. 6 a flow diagram of a method for assembling the electron gun device.

FIG. 6 depicts a flow diagram of a method for assembling the electron gun device. In a step 100 the electrodes 14, 18, 44, the insulators 22, 23 and the brazing foils 34, 36 are stacked as shown in FIG. 3. In the following step 110 this assembly is brazed by active metal brazing in a high temperature vacuum furnace (not shown). In a following step 120 the assembly is allowed to cool down or is actively cooled down. In a step 130 the electrode emitter 64 is mounted to the third electrode 44. In a step 140 all remaining electrical connections for connecting the first electrode 14 and the second electrode 18 are finalized. In alternative embodiments, the step 130 and/or the step 140 could also be done at the beginning.

REFERENCE NUMERALS

10 electron gun device
12 X-ray tube
14 first electrode
16 first electrode contact surface
18 second electrode
20 second electrode contact surface
22 insulator
23 further insulator
24 first insulator contact surface
26 axial direction
28 second insulator contact surface
30 first brazing joint
32 second brazing joint
34 first brazing foil
36 second brazing foil
38 holding feature
40 first collar
42 electrode-insulator interface
44 third electrode
46 target
48 high voltage supply
50 electron tube
52 target head
54 window
56 electrons
58 X-rays
60 voltage supply connection
62 electron beam direction
64 electron emitter
66 first passage
68 second passage
70 open interior
72 further open interior
74 second collar
100 Step
110 Step
120 Step
130 Step
140 Step

What is claimed is:

1. An electron gun device comprising: a metallic first electrode having a first electrode contact surface; a metallic second electrode having a second electrode contact surface; and a ring-shaped ceramic insulator having a first insulator contact surface on a first side with respect to an axial direction of the insulator and a second insulator contact surface on an opposite second side with respect to the axial direction, wherein, in an assembled state, the first insulator contact surface faces the first electrode contact surface and is connected to the first electrode contact surface via a first brazing joint, and the second insulator contact surface faces the second electrode contact surface and is connected to the second electrode contact surface via a second brazing joint.

2. The electron gun device according to claim 1, wherein the first brazing joint and/or the second brazing joint is an active brazing joint.

3. The electron gun device according to claim 1, wherein the first insulator contact surface and/or the second insulator contact surface contains unmetallized portions and is preferably essentially completely unmetallized before brazing.

4. The electron gun device according to claim 1, wherein the first brazing joint is done using a first brazing foil between the first electrode contact surface and the first insulator contact surface and/or the second brazing joint is done using a second brazing foil between the second electrode contact surface and the second insulator contact surface.

5. The electron gun device according to claim 1, wherein the first electrode and/or the second electrode contains and is preferably made from molybdenum or an alloy thereof.

6. The electron gun device according to claim 1, wherein the insulator contains and is preferably made from aluminum oxide or aluminum nitride.

7. The electron gun device according to claim 1, wherein the insulator comprises at least one holding feature for delimiting a flow of a brazing filler metal during brazing.

8. The electron gun device according to claim 7, wherein the at least one holding feature is further intended for positioning a brazing foil prior to the brazing.

9. The electron gun device according to claim 7, wherein the at least one holding feature comprises a first collar at least partly and preferably completely encircling the first insulator contact surface and/or a second collar at least partly and preferably completely encircling the second insulator contact surface.

10. The electron gun device according to claim 7, wherein the at least one holding feature at least partly overlaps the first electrode and/or the second electrode preferably at least with respect to the axial direction.

11. The electron gun device according to claim 7, wherein the at least one holding feature is intended to act as a dielectric barrier against spurious electron emission in a vicinity of an electrode-insulator interface.

12. An X-ray tube comprising the electron gun device according to claim 1.

13. A method for assembling of an electron gun device comprising: a metallic first electrode having a first electrode contact surface; a metallic second electrode having a second electrode contact surface; and a ring-shaped ceramic insulator having a first insulator contact surface on a first side with respect to an axial direction of the insulator and a second insulator contact surface on an opposite second side with respect to the axial direction, wherein the first insulator contact surface is mounted facing the first electrode contact surface and is connected to the first electrode contact surface via a first brazing, and the second insulator contact surface is mounted facing the second electrode contact surface and is connected to the second electrode contact surface via a second brazing, preferably conducted simultaneously to the first brazing.

14. The method according to claim 13, wherein brazing is done using an active brazing filler metal on unmetallized insulator contact surfaces.

15. The method according to claim 13, wherein the first brazing is made using a first brazing foil between the first electrode contact surface and the first insulator contact surface and/or the second brazing is made using a second brazing foil between the second electrode contact surface and the second insulator contact surface.

* * * * *